(12) United States Patent
Lee et al.

(10) Patent No.: US 6,612,478 B2
(45) Date of Patent: Sep. 2, 2003

(54) METHOD FOR MANUFACTURING X-RAY TUBES

(75) Inventors: David S. K. Lee, Salt Lake City, UT (US); Richard R. Sano, Salt Lake City, UT (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 09/855,555

(22) Filed: May 14, 2001

(65) Prior Publication Data

US 2002/0168051 A1 Nov. 14, 2002

(51) Int. Cl.[7] ............................................. B23K 20/08
(52) U.S. Cl. ...................................................... 228/107
(58) Field of Search ........................................ 228/107

(56) References Cited

U.S. PATENT DOCUMENTS

| | | | |
|---|---|---|---|
| 3,024,526 A | | 3/1962 | Philipchuk et al. .......... 228/109 |
| 3,798,747 A | | 3/1974 | Lalwaney ..................... 72/364 |
| 5,930,332 A | * | 7/1999 | Eggleston et al. ........... 378/144 |
| 6,021,174 A | * | 2/2000 | Campbell .................... 378/125 |
| 6,118,852 A | * | 9/2000 | Rogers et al. ............... 378/140 |

OTHER PUBLICATIONS

Article: Explosive Welding: Principles and Potentials by David G. Brasher and Donald J. Butler, date unknown, pp. 37–38.

Article: Explosion Bonding of Dissimilar Materials for Fabricating APS Front End Components—Analysis of Metallurgical and Mechanical Properties and UHV Application by Yuheng Li, Deming Shu and Tuncer M. Kuzay, dated Jun. 15, 1994, pp. 1, 3, 5, 7.

Article: Explosive Bonding and Its Application in the Advanced Photon Source Front–End and Beamline Components Design by D. Shu, Y. Li, d. Rydling and T.M. Kuzay, dated Feb. 1995, pp. 1783–1785.*

Article: Explosive Welding Engineering and Desgin Basics by High Energy Metals, Inc., dated Mar. 12, 1998, pp. 1–3.*

* cited by examiner

Primary Examiner—M. Alexandra Elve
Assistant Examiner—Kevin P. Kerns
(74) Attorney, Agent, or Firm—Workman, Nydegger & Seeley

(57) ABSTRACT

A method for manufacturing x-ray tube parts, wherein metallic pieces are explosively bonded together to establish a high strength, stable union between them. The x-ray tube parts may then be milled from the bonded metallic pieces. The explosion bonding process creates only discrete intermetallic components in the joint region instead of a continuous, weakening intermetallic layer common in brazed joints. An explosion bond joint is characterized by a wavelike interface, thereby increasing surface area over which the components are bonded and further increasing bond integrity. Stems, rotor hubs, rotor sleeves, anodes, and other tube components may be manufactured using this method.

14 Claims, 7 Drawing Sheets

METHOD FOR MANUFACTURING X-RAY TUBES

BACKGROUND OF THE INVENTION

1. The Field of the Invention

The present invention relates generally to x-ray tubes. More specifically, the present invention relates to an improved method for manufacturing and assembling components of x-ray tubes.

2. The Relevant Technology

X-ray producing devices are extremely valuable tools that are used in a wide variety of applications, both industrial and medical. For example, such equipment is commonly used in areas such as diagnostic and therapeutic radiology; semiconductor manufacture and fabrication; and materials analysis and testing. While used in a number of different applications, the basic operation of x-ray tubes is similar. In general, x-rays, or x-ray radiation, are produced when electrons are accelerated, and then impinged upon a material of a particular composition.

Typically, this process is carried out within a vacuum enclosure formed as a part of the x-ray tube structure. Disposed within the evacuated enclosure is an electron generator, or cathode, and an anode, which is spaced apart from the cathode. In operation, electrical power is applied to a filament portion of the cathode, which causes electrons to be emitted. A high voltage potential is placed between the anode and the cathode, which causes the emitted electrons to accelerate towards a target surface on the anode. Typically, the electrons are "focused" into an electron beam towards a desired "focal spot" located on the target surface.

During operation of the x-ray tube, the electrons in the beam strike the target surface (or focal track) at a high velocity. The target surface on the target anode is composed of a material having a high atomic number, and a small portion of the kinetic energy of the striking electron stream is thus converted to electromagnetic waves of very high frequency, i.e., x-rays. The resulting x-rays emanate from the target surface, and are then collimated through a window formed in the x-ray tube for penetration into an object, such as a patient's body. As is well known, the x-rays can be used for such applications as therapeutic treatment, x-ray medical diagnostic examination, or material analysis procedures.

In addition to stimulating the production of x-rays, the kinetic energy resulting from the striking electrons also produces a significant amount of heat in the target anode and surrounding region. As a result, the area of the target anode typically experiences extremely high operating temperatures. At least some of the heat generated in the target anode is absorbed by other structures and components of the x-ray device as well.

In addition, a percentage of the electrons that strike the anode target surface rebound from the surface and then impact other "non-target" surfaces within the x-ray tube enclosure. These are often referred to as "secondary" electrons. These secondary electrons retain a significant amount of kinetic energy after rebounding, and when they impact these other non-target surfaces, a significant amount of heat is generated in these areas as well. The heat produced by secondary electrons, in conjunction with the high temperatures generated by the primary electron beam, often reaches levels high enough to damage portions of the x-ray tube structure. For example, the joints and connection points between x-ray tube structures can be weakened when repeatedly subjected to such thermal stresses. Ultimately, these conditions can shorten the operating life of the tube, and can affect its operating efficiency, and/or render it inoperable.

The various joints and connection points between various tube components can be especially vulnerable to thermal stresses. For example, during assembly, tube parts comprising differing metallic substances, such as the stem and rotor hub portions of a rotating anode x-ray tube, are typically joined together with a braze joint. A brazing compound, such as a palladium cobalt alloy, is frequently used to join the stem, usually made of TZM (an alloy comprising titanium, zirconium, and molybdenum), to the rotor hub which usually comprises core iron or Ni-base superalloy, such as Incoloy 909. This type of brazing is used to interconnect other x-ray tube components as well.

Conventional brazing materials and procedures, as well as other conventional bonding techniques, suffer from several disadvantages, especially when subjected to the high operating temperatures of an x-ray tube. In general, braze materials have relatively low melting points compared to the materials that are being bonded. Thus, the braze is susceptible to damage from high operating temperatures. Also, brazed joints tend to crack when subjected to the mechanical and thermal stresses present during tube operation. Such cracks usually form in the braze layer itself or in the adjacent substrate material, and may be caused by improper brazing technique, or by an intermetallic layer that often forms as a byproduct during brazing. This intermetallic layer forms along the joint seam and may contain a mixture of any of the compounds that comprise the brazing compound, or of the component materials that are being attached, such as the stem or rotor hub. This intermetallic layer can result in a brittle "weak link" in the joint and, when subjected to the harsh operating conditions within the x-ray tube—which may include temperatures in excess of 850° C., a near vacuum, and rotational rates up to about 10,000 revolutions per minute ("rpm")—tiny fissures, or "microcracks" may begin to form in the intermetallic layer or adjacent component material. These microcracks expand over time and cause a gradual weakening of the bond between the components. Such weakening induces instability and wobbling into the rotating anode target that can result in the premature mechanical failure of one or more tube components, or can decrease the operating efficiency of the tube.

Another problem exists with conventional bonding techniques, especially when used to join a stem to a rotor hub. Before brazing the two parts together, both the end of the stem to be joined and the portion of the hub receiving the stem are given complimentary threads, which are used to screw the two parts together in a frictional joining arrangement. Voids are unavoidably created between these threads after the parts are screwed and then brazed together, temporarily trapping atmospheric gasses present during tube assembly. These gasses can later escape the voids during tube operation and cause undesirable outgassing that adversely affects the performance of the x-ray device.

When such brazing techniques are used to connect other x-ray tube components, similar problems are also encountered. For example, brazing is often used to bond the target layer material to an underlying substrate material to form the anode structure. Again, the resulting joint is especially susceptible to high thermal stresses, and thermal mismatches between the target material, the braze bond, and the underlying substrate often cause cracks to form within the anode, ultimately resulting in anode failure, or decreasing its operating efficiency. Moreover, the brazing or casting process typically introduces a change in microstructural textures of the adjacent materials, such as recrystallization and grain growth. Again, this phenomena can result in the formation of microcracks, which ultimately can lead to a failure of the device. Grain growth can also reduce the strength and ductility of the adjacent materials Conventional brazing techniques used in an x-ray tube environment suffer from other drawbacks as well. In particular, the process involves a fairly complex and expensive manufacturing process. For example, there is typically a need for extensive chemical cleaning and/or purified water ultrasonic cleaning before a brazing process. Also, typically extensive high temperature outgassing runs are needed to keep the surfaces of the materials clean before brazing. Moreover, the process can only be done in a piece-by-piece manner, which limits the quantity of parts that can be manufactured, thereby increasing costs. Testing of a brazed joint is also difficult, and often there is no sure way to examine the integrity of the bond unless complex and costly testing procedures and equipment are used.

In light of the foregoing, a need therefore exists for a method of manufacturing x-ray tube components that provides an improved manner for bonding together x-ray tube components.

SUMMARY OF PRESENTLY PREFERRED EMBODIMENTS

Briefly summarized, presently preferred embodiments of the present invention are directed to an improved x-ray tube in which selected components are secured together using an explosion bonding process. The preferred explosion bonding process utilizes the highly compressive force that accompanies a controlled explosion to push two materials together such that they form between them a high strength, metallurgical bond. The characteristics of the resulting bond are especially desirable for use in an x-ray tube environment because it is better able to withstand the environmental conditions of an x-ray tube.

While the disclosed bonding process can be used to attach a number of different tube components, in one preferred embodiment, the process is used to bond the stem and the rotor hub portions of an x-ray tube. The resulting bond is desirable in a number of respects. First, the resulting metallurgical bond interface between the stem and the rotor hub is characterized by the absence of a continuous intermetallic compound layer. Instead, only discrete particles of intermetallic materials are found in the joint region. The metallurgical bond, together with the absence of a continuous intermetallic layer, makes the explosively bonded joint much stronger than a conventional brazed joint.

In addition, the process provides a stronger bond. The joint between the explosively bonded stem and rotor hub is characterized by a peak-and-valley, or wave-like pattern at the interface. This characteristic is a byproduct of the explosion bonding process and effectively increases the surface area over which the two dissimilar materials may bond, thereby increasing the bond strength. It also results in a mechanically stronger joint under shear stress, because the wave pattern provides a screw thread-type interface. In contrast, a brazed joint interface is flat, and may more easily yield to shear stresses that can result from different thermal expansion rates of the materials, or the high rotational speeds of the anode.

Also, while in one preferred embodiment the explosion bonding process is used to connect the stem portion to the rotor hub portion, in other embodiments the process is used to connect different tube components. For instance, the process can be used to attach a rotor sleeve portion to the rotor hub portion. Or, the process can be used to bond a target surface material to an underlying substrate to form a rotating or stationary anode.

The explosion bonding process is also advantageous in a manufacturing sense. The process reduces the need for extensive cleaning of the parts before bonding, nor is there a need for extensive outgassing runs before bonding. Further, depending on the components being manufactured, the process is amenable to the production of a large quantity of parts such as a batch process, as opposed to the piece-by-piece production steps involved with brazing.

To summarize, use of an explosive bonding method for bonding x-ray tube components together addresses a number of problems. In particular, the approach provides excellent bonding characteristics for attaching various x-ray tube components and parts that are particularly susceptible to the harsh thermal and mechanical stresses in an operating x-ray tube. Parts such as the stem and rotor hub, anode target to anode substrate, and rotor sleeves to rotor jackets, and other component parts of the x-ray tube assembly, all benefit from the improved bond provided by explosion bonding—both in a manufacturing and a structural sense. Specifically, the resulting joint is sufficiently strong to prevent the formation of microcracks therein, and that is better able to withstand shear stresses. This extends the useful life of the tube components, insures increased operating efficiency, and contributes to an increased x-ray tube performance and lifetime.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

Figure 1:
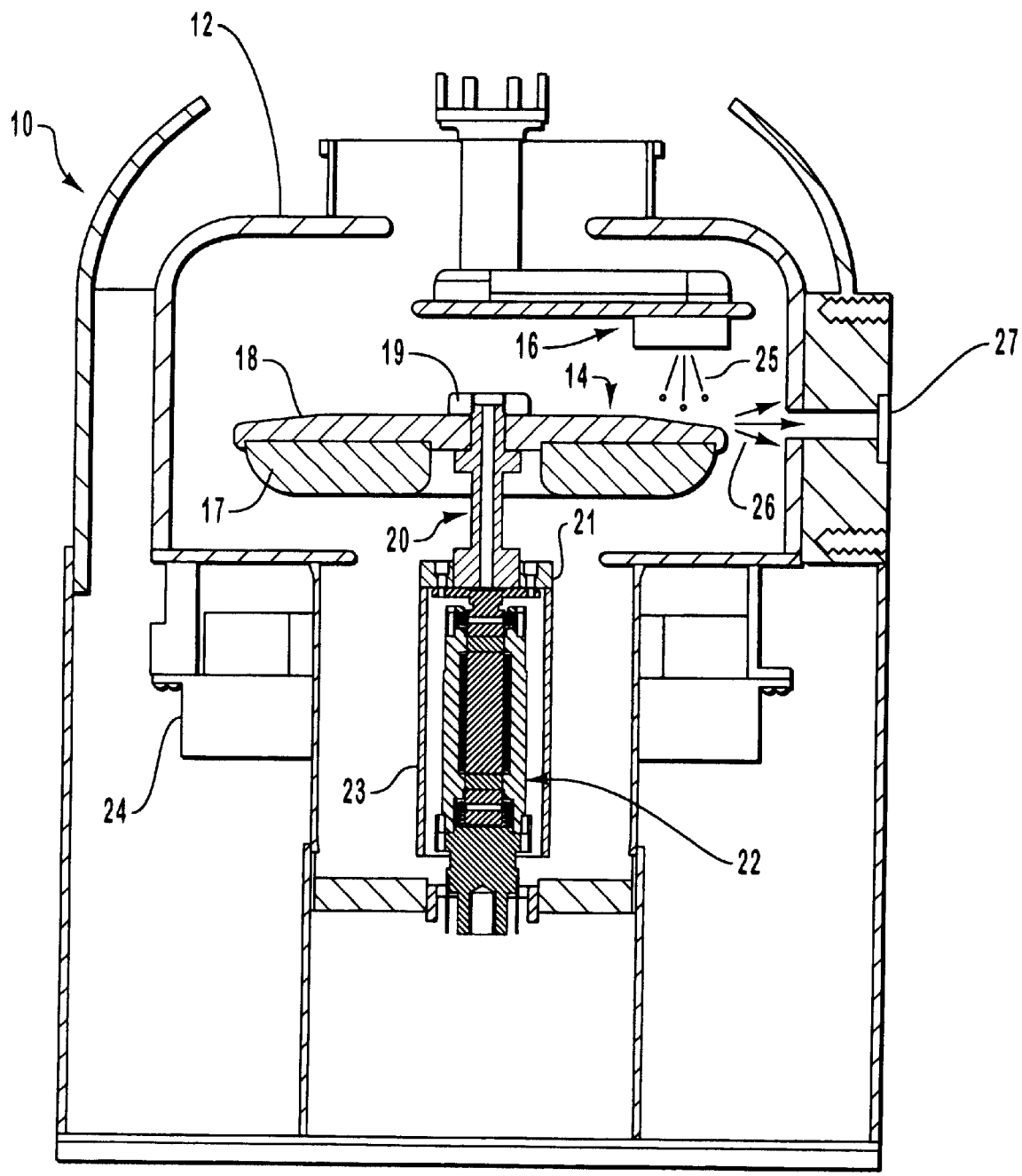
FIG. 1 is a simplified cross sectional side view of an exemplary x-ray tube incorporating components manufactured in accordance with the present invention.

Reference is first made to FIG. 1, which illustrates the simplified structure of a rotating anode-type x-ray tube, designated generally at 10. The x-ray tube 10 includes an evacuated housing 12 in which is disposed a rotating anode structure, designated generally at 14, and a cathode structure, designated generally at 16. The anode 14 is spaced apart from and oppositely disposed to cathode 16. In the illustrated embodiment, the anode structure 14 includes a target surface 18 that is disposed on top of an underlying anode substrate 17. The anode 14 has a central axis about which the target surface rotates.

The anode structure 14 is operably connected to a stem 20, which is connected along the rotating central axis of the anode, such as a lock nut 19 or similar attachment scheme. In order to minimize its cross sectional area and, correspondingly, its heat conducting capability, the stem 20 is preferably formed as a hollow shaft. As is shown, the stem 20 is operably connected to a rotor hub 21, which is fastened by appropriate means, such as screws, to a bearing assembly 22 in such a way as to permit free axial rotation of the rotor hub 21, the stem 20, and the connected anode structure 14. As is shown, an outer rotor sleeve 23 is positioned so as to be coaxial with and concentrically disposed about the bearing assembly 22 and is attached to the rotor hub 21. The sleeve 23 protects the bearing assembly from heat damage during tube operation, and forms the inductive portion of a stator motor. In this way, the rotor sleeve 23, rotor hub 21, stem 20, and the anode structure 14 are caused to rotate within the evacuated housing 12 during tube operation by the stator motor 24, or any other appropriate method.

The operation of an x-ray tube device is well known. The filament portion (not shown) of the cathode structure 16 is connected to an appropriate power source (not shown). The anode and cathode together are also connected within an electrical circuit that provides a high voltage potential between the anode (positive) and the cathode (negative). The electrical current that passes through the filament portion of the cathode 16 causes a stream of electrons, designated at 25, to be emitted by thermionic emission. The high voltage differential between the anode structure 14 and the cathode 16 causes the electrons 25 to accelerate from the cathode toward the target surface 18 of the anode. During this operation, the anode target surface 18 is being rotated at a high rate of revolution by the stator 24. As they accelerate, the electrons 25 gain a substantial amount of kinetic energy. Upon impacting the target surface 18, some of the electrons 25 convert their kinetic energy to electromagnetic waves of very high frequency, i.e., x-rays. The resulting x-rays, designated at 26, emanate from the anode target surface 18 and are then collimated through a window 27 for penetration into an object, such as an area of a patient's body. As is well known, the x-rays that pass through the object can be detected and analyzed so as to be used in any one of a number of applications, such as x-ray medical diagnostic examination or materials analysis procedures.

The stem 20 is typically composed of a material having a high melting point and high thermal conductivity, such as TZM. This enables a portion of the heat produced in the anode structure 14 to be conducted through the stem 20 and dissipated through the walls of the evacuated housing 12. In contrast, the rotor hub 21 is typically constructed from core iron or similar material. This material has a relatively low thermal conductivity, which tends to prevent heat conducted from the stem 20 from passing through the rotor hub 21 to the bearing assembly 22, which is easily and adversely affected by excessive heat. The heat that is conducted through the rotor hub 21 is preferably transmitted to the rotor sleeve 23, where it may be more effectively dissipated to the walls of the evacuated housing 12. Again, dissipation of heat in this manner tends to protect the components of the bearing assembly 22. The rotor hub 21 may also be constructed from other materials well known in the art, such as steel or nickel-based superalloys (e.g., Inconel, Incoloy, Hastelloy), which provide similar thermal characteristics.

Presently preferred embodiments provide a novel method for connecting the stem 20 and the rotor hub 21 in a manner that exhibits excellent bond characteristics in the x-ray tube operating environment. More specifically, in one embodiment, the stem 20 and the rotor hub 21 are bonded using a high pressure process called explosive bonding. This process creates a high strength stable bond between the materials of the two components, thus minimizing the creation of intermetallic layers in the joint region, which can weaken the bond between the stem and rotor hub and reduce the operating lifetime of the parts by creating a greater possibility of premature mechanical failure. What intermetallic compounds are formed are interspersed within the joint region and do not significantly weaken the joint between the bonded components.

One example of an explosion bonding process is described in U.S. Pat. No. 3,024,526 issued to Philipchuk, et al., which is hereby incorporated by reference in its entirety. Generally, the process uses the high pressures (typically 100,000 to 600,000 psi) of a controlled explosion to force two or more metals together. After the process is complete, the two or more metals are joined by a high quality metallurgical bond characterized by wave-like joint interface.

In one preferred embodiment, the explosion bonding process occurs as follows: a first and a second metal piece are placed proximate one another such that a small gap is defined by a surface from both the first and the second metal piece. A suitable explosive material, such as PETN, Primacord, Tetryl, RDX, or TNT, is packed on another surface of the first metal piece such that the first metal piece is disposed between the explosive material and the second metal piece. The explosive material is then detonated, creating a high pressure detonation front that travels along the surface of the first metal piece, progressively eliminating the small gap by pressing the first metal piece onto the second metal piece.

During the explosive event, the first few atomic layers on the interior surfaces of the metal pieces to be joined are fluidized and ejected as a plasma jet in front of the detonation front as it travels in the small gap along the metal pieces. This plasma jet scrubs the joining surfaces of the metal pieces ahead of the collision front, thus eliminating oxidation and other impurities and providing clean surfaces for bonding. The fluidization of the interior surfaces accounts for the rippled shape of the joint formed between the metal pieces, which in turn increases the surface area over which the pieces are bonded, further strengthening the joint. The explosive event, and concurrent fluidization and plasma heating of the interior metal surfaces, occurs with such high velocity that the heated zone in the joint region is microscopically deep in either metal joining surface. The rest of the volume of each metal piece therefore acts as a giant heat sink, thereby eliminating significant heating of the metal piece during bonding. Once the detonation front has traveled the length of the metal pieces, the explosive event ceases, and the pieces are now permanently joined.

The bond created by the explosion bonding process is an interatomic, or metallurgical bond, and features minimized production of bond weakening intermetallic substances in the joint region. Dissimilar metals that are difficult to bond with other techniques are often favorably joined using this method.

Figure 2A:
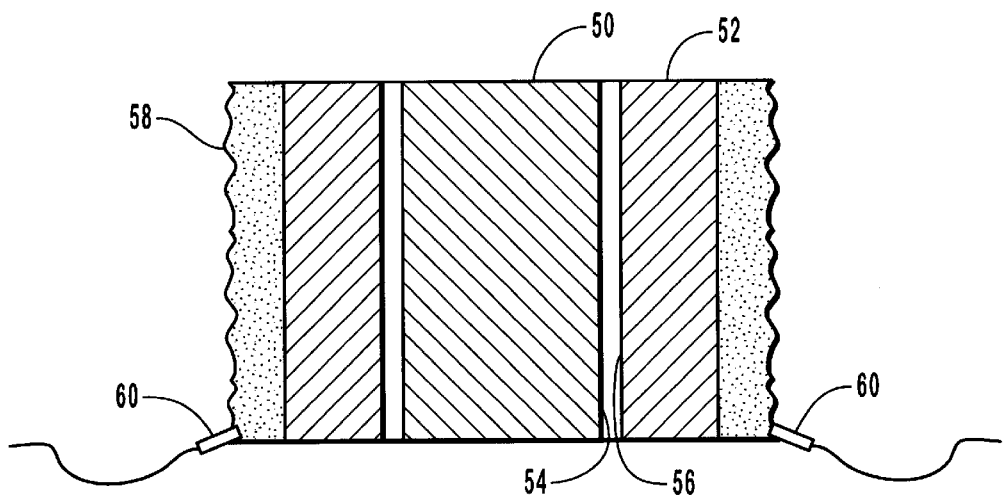
FIG. 2A is a cross sectional side view of coaxial cylinders used to produce the stem and rotor hub of an x-ray tube, illustrating their arrangement before explosion bonding occurs.

In one presently preferred embodiment, the explosion bonding process is used as a means for connecting the rotor hub 21 to the stem 20. FIGS. 2A, B, and C depict one example of how this is accomplished. In a preferred embodiment, a solid inner cylinder 50 is disposed coaxially within a hollow outer cylinder 52 such that a small spacing exists between the outside diameter of the inner cylinder, or inner joining surface 54, and the inside diameter of the outer cylinder, or outer joining surface 56. The spacing may be varied as appreciated by one of skill in the art in order to ensure a complete bond between the two components. Although not essential, thin coatings may be applied to the inner and outer joining surfaces 54 and 56 to enhance the explosive bonding of the inner and outer cylinders 50 and 52. Examples of such coatings include, but are not limited to, nickel, chromium, and copper. An explosive material 58 is packed about the outside surface of the outer cylinder 52 along the length of the cylinder. One or more detonators 60 are placed into the explosive material 58 near one end of the outer cylinder 52.

Figure 2B:
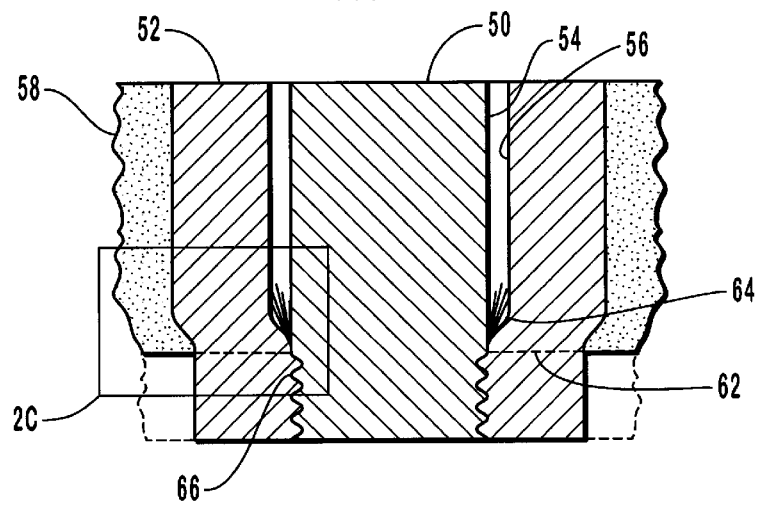
FIG. 2B is a cross sectional side view as in FIG. 2A, illustrating the explosion bonding of the two cylinders in mid-event.

The discharging of the one or more detonators 60 begins the explosion bonding process, which preferably takes place in a controlled environment to prevent unintended injury to persons or objects. The explosive material 58 begins to burn in a circumferential ring about the outer cylinder 52, thereby forming a detonation front 62, as seen in FIG. 2B. The detonation front 62 travels along the cylinder surface from one end of the outer cylinder 52 to the other end at a velocity characteristic of the explosive material 58. As the detonation front 62 burns along the outer cylinder 52, remnants and byproducts of the explosive material 58 are left behind on the outer cylinder.

Figure 2C:
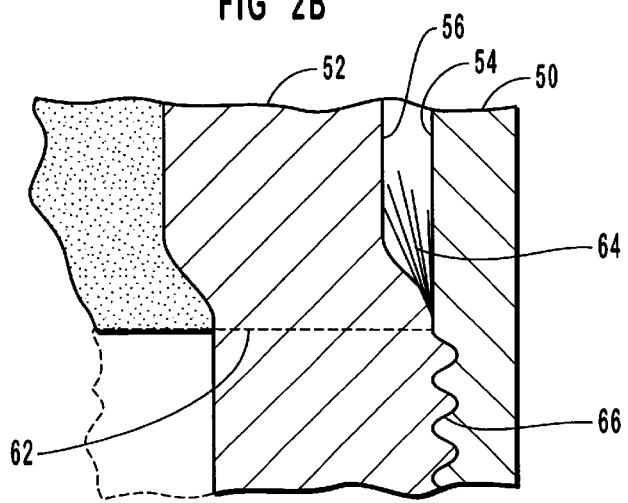
FIG. 2C is a close-up cross sectional side view of the designated area in FIG. 2B, illustrating the explosion bonding in mid-event.

Reference is now made to FIG. 2C, which depicts the explosion bonding process in mid-event. As the explosive material 58 burns along the detonation front 62, the outer cylinder 52 is compressed by the tremendous pressure created by the explosion inward until the outer joining surface 56 impacts upon the inner joining surface 54 of the inner cylinder 50. The high pressure impact causes a plasma jet 64 of surface atoms from the cylinders to be spewed ahead of the detonation front. Ahead of the detonation front 62, the plasma jet 64 scrubs both the inner joining surface 54 and the outer joining surface 56. Considerable heat is produced by the impact and the plasma jet 64, but it is quickly absorbed and dissipated into both the inner cylinder 54 and the outer cylinder 52.

Behind the detonation front 62, both inner joining surface 54 and outer joining surface 56 have been metallurgically bonded to one another, thus forming a joint 66. Depending on the velocity at which the detonation front 62 traveled along the outer cylinder 52, the joint 66 is defined by a wave-like interface of some magnitude. Higher detonation front velocities generally produce interface waves of higher amplitude, while slower velocities produce more linear joints 66. (As in the other appended drawings, the wave-like shape of the joint 66 in FIGS. 2B and 2C has been exaggerated for the sake of clarity.) Such wave-like joints are useful for creating a larger surface area over which the two cylinders 50 and 52 may bond, thus enhancing the strength of the joint 66.

Figure 3A:
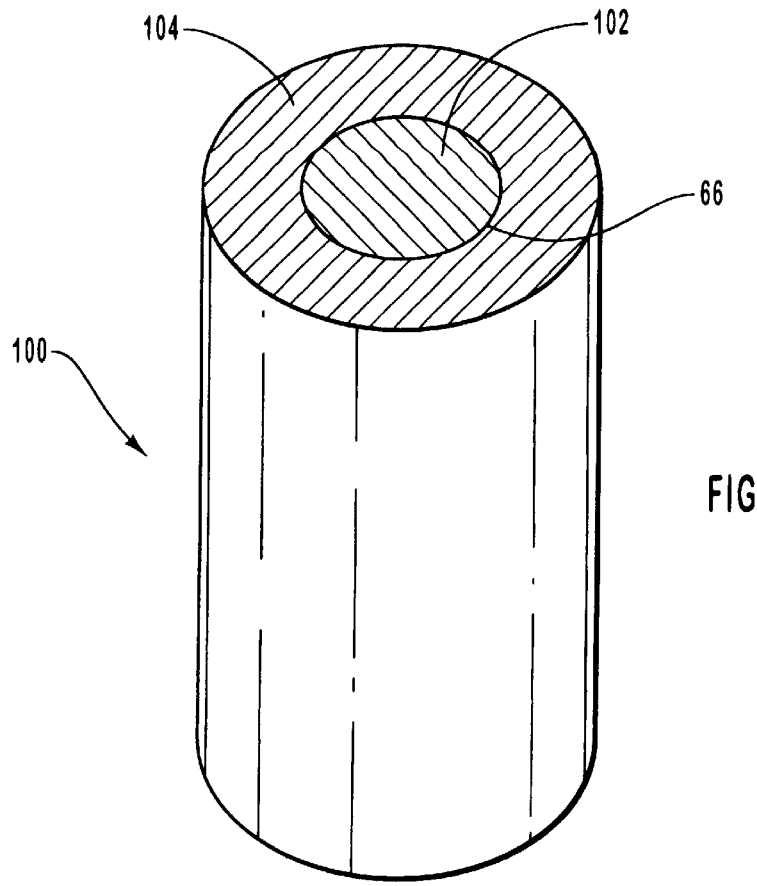
FIG. 3A is a perspective view of the two coaxial cylinders of FIG. 2A after being explosively bonded.

FIG. 3A depicts the resulting product after the explosion bonding is complete. Inner cylinder 50 and outer cylinder 52 are now joined to form a bonded cylinder 100 having an inner region 102 preferably comprising TZM, and a coaxial outer region 104 preferably comprising core iron, with the joint 66 between them. The explosion bonding method may create intermetallic particles in the region of the joint 66 as a byproduct of the localized heat and pressure present during the bonding process. These intermetallics, however, do not form a continuous layer, as is often the case when brazing is used to join tube components. Instead, only discrete intermetallic particles comprising any combination of titanium, zirconium, molybdenum, and iron are present in the region of the joint 66 of the explosively bonded cylinder 100. Thus no significant weakening of the bond occurs because of these intermetallic particles.

As explained above, the explosively bonded cylinder 100 features a high strength joint 66 between the inner region 102 and the outer region 104. If desired, the joint 66 may be verified as to its strength using ultrasonic testing or other analysis procedures to ensure its integrity.

Figure 3B:
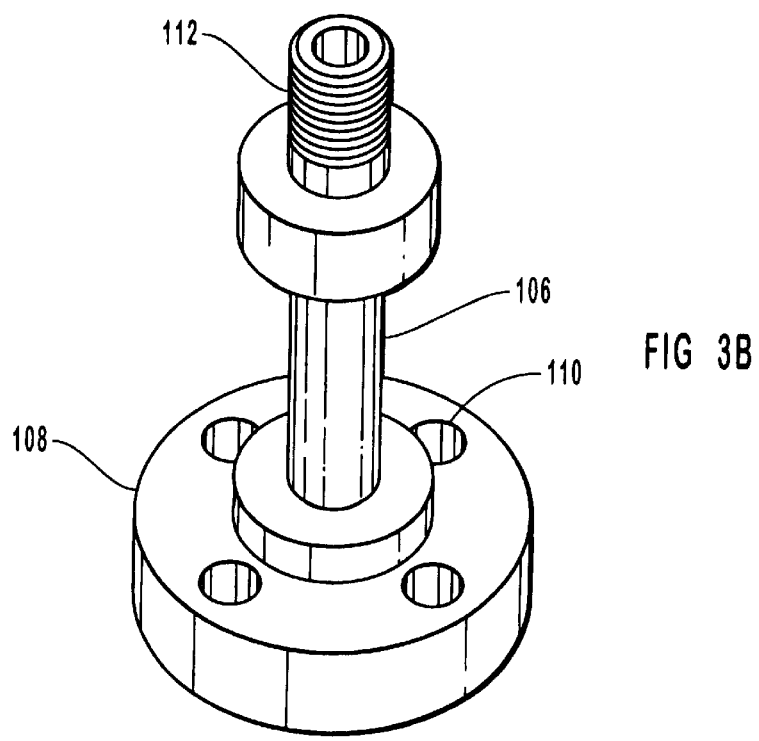
FIG. 3B is a perspective view of a stem and rotor hub that have been machined from the explosively bonded coaxial cylinders shown in FIG. 3A.

FIG. 3B illustrates a stem 106 and a rotor hub 108 that have been milled from the bonded cylinder 100. The inner region 102 of the bonded cylinder 100 is preferably milled into a stem 106, while the outer region 104 is milled to define a rotor hub 108. A plurality of holes 110 is defined through the rotor hub 108, sized and configured to receive screws that attach the rotor hub to the bearing assembly 22. The stem 106 has defined near an end thereof threads sized and configured to mesh with corresponding threads 112 defined on a lock nut 19 (see FIG. 1) and/or the rotating anode structure 14, thereby operably connecting the two components. As discussed above, the stem 106 is preferably bored hollow to reduce the transmission through it of heat from the rotating anode structure 14 during tube operation.

Though the above discussion has concentrated on explosively bonding two metal pieces to form x-ray tube components, it will be appreciated that three or more pieces could be joined, either simultaneously or sequentially, using the explosion bonding method herein described. In a sequential bonding process, for example, the first two of three metallic pieces could be explosively bonded, creating a joined component. A third piece could then be explosively bonded to the joined component, thus creating one, two, or more x-ray tube components. Such multiple-piece explosive bonding methods are accordingly appreciated as residing within the scope of the present invention.

Figure 4A:
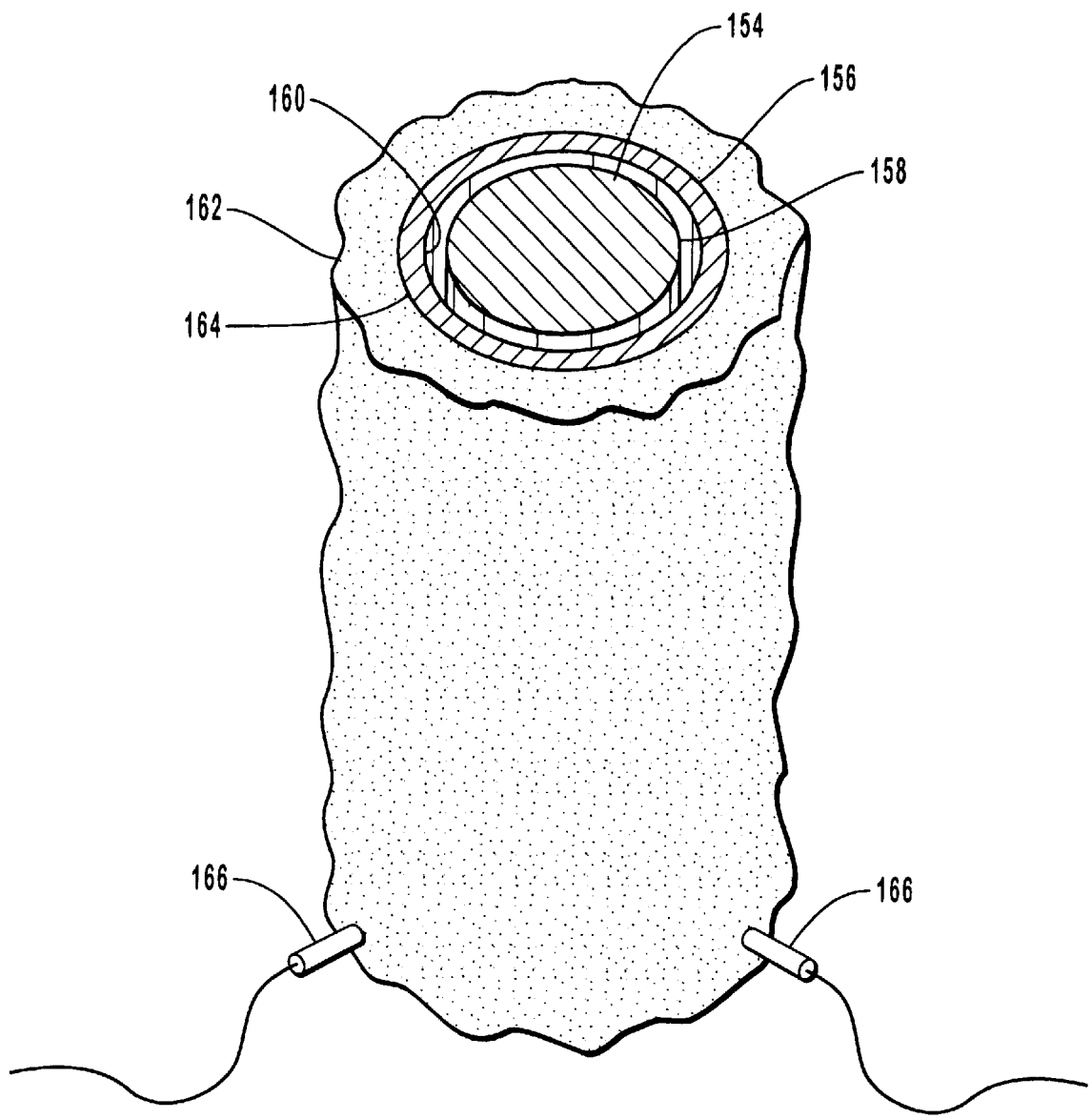
FIG. 4A is a perspective view of two coaxial cylinders used to produce the bi-metal rotor sleeve and inner jacket of a rotor, illustrating their arrangement before explosion bonding occurs.
Figure 4B:
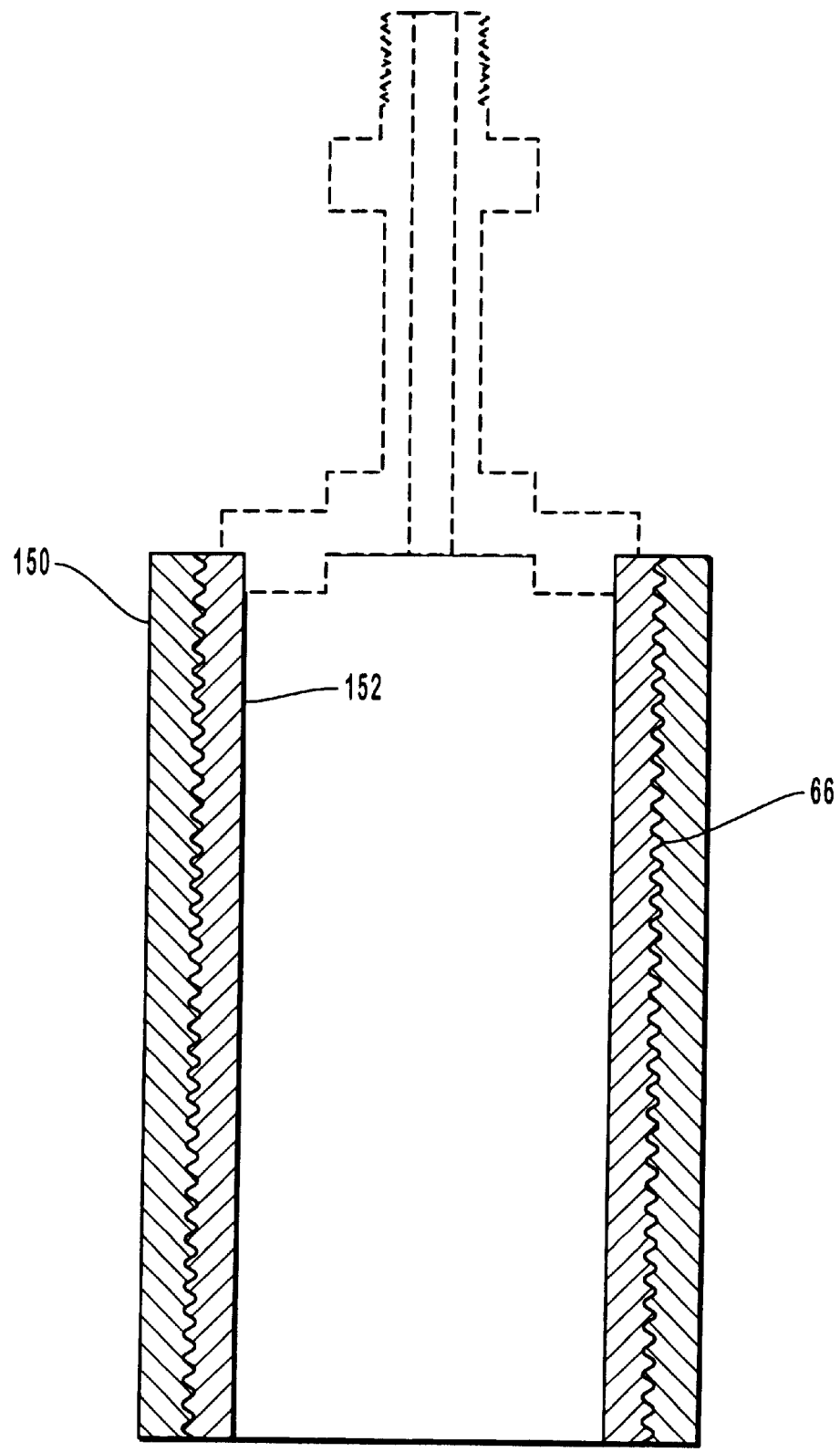
FIG. 4B is a cross sectional side view of a rotor sleeve and inner jacket that have been explosively bonded in accordance with an alternative embodiment of the present invention, with a stem and rotor hub shown in phantom and operably attached thereto.

FIGS. 4A, B, and C depict alternative embodiments to the present method for manufacturing x-ray tube components. In FIG. 4B, a rotor sleeve 150, preferably comprising oxygen free, high conductivity ("OFHC) copper, a copper alloy (such as GlidCop® AL-15, from SCM Metal Products, Inc.), or the like, is shown in cross section explosively bonded to an inner jacket 152, as described below. The inner jacket 152 comprises a metal, such as 1018 steel, core iron, or other suitable magnetic metal or alloy. The word "steel" as used herein is defined as an alloy of iron and carbon, and may contain other constituents depending on the properties desired. The inner jacket 152 is disposed inside of and coaxial with the rotor sleeve 150, and outside of and coaxial with the bearing assembly 22 in order to shield the bearing assembly from the magnetic fields produced by the stator 24 during tube operation.

To manufacture the inner jacket/rotor sleeve bonded component, a solid inner cylinder 154 is disposed coaxially within a hollow outer cylinder 156, with a small spacing existing between an inner joining surface 158 of the inner cylinder and an outer joining surface 160 of the outer cylinder, as shown in FIG. 4A. An explosive material 162 is packed about the outer surface 164 of the outer cylinder 156, and one or more detonators 166 are operably inserted into the explosive material.

The inner and outer cylinders 154 and 156, prepared as described above, are then placed in a controlled environment and explosively bonded to one another in accordance with the present method. The central portion of the inner cylinder 154 is then milled to form the inner jacket 152, while the outer cylinder 156 remains substantially as is to become the rotor sleeve 150.

Once the explosion bonding is complete, the bonded rotor sleeve 150 and inner jacket 152, shown in cross section in FIG. 4B, are joined to a rotor hub and stem, depicted in phantom in FIG. 4B, preferably by welding, brazing, or the like. The rotor hub and stem to which the bonded rotor sleeve 150 and inner jacket 152 are joined also may have been explosively bonded or merely joined using techniques previously known in the art. This method of manufacture of these x-ray tube components may be desirable.

Figure 4C:
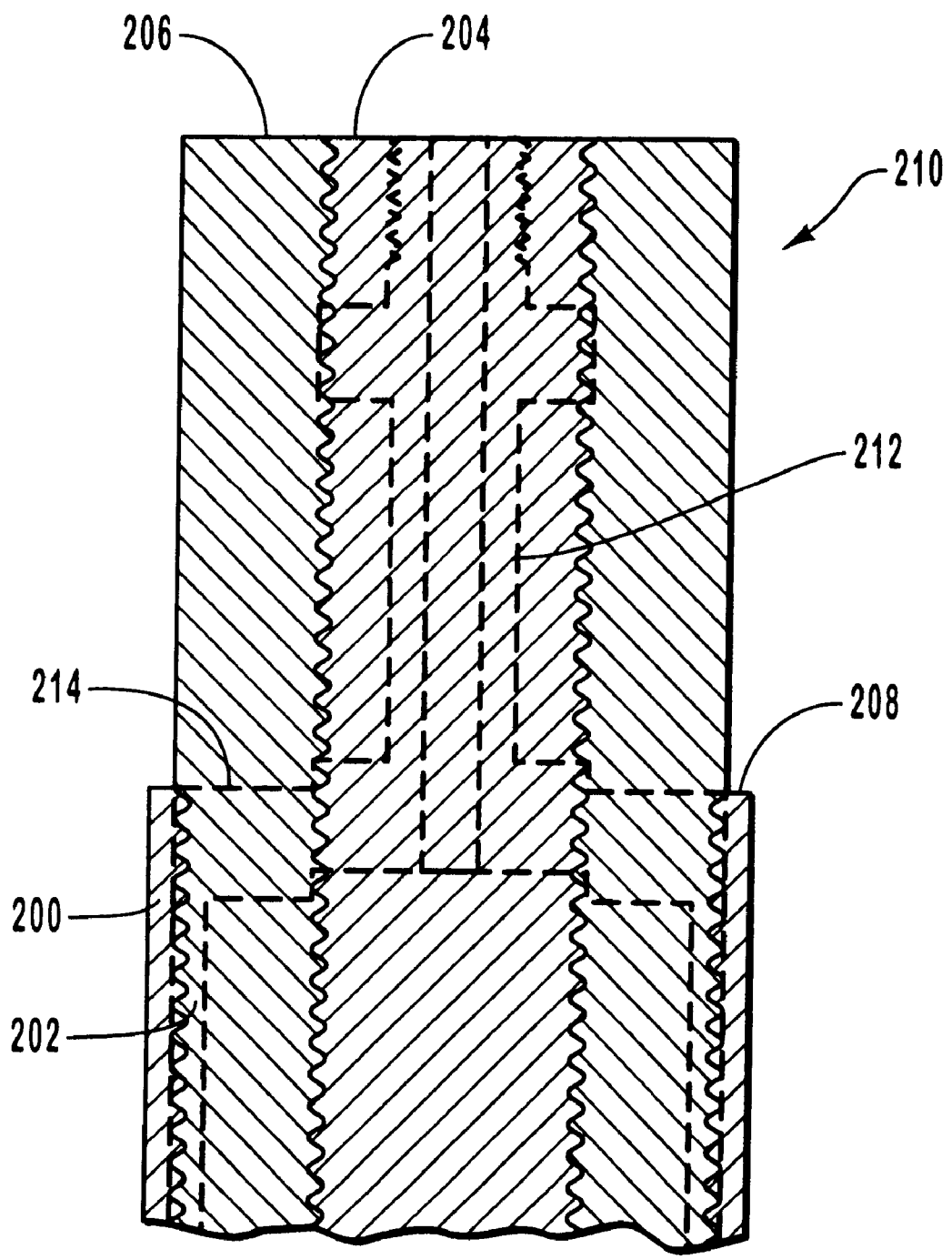
FIG. 4C is a cross sectional side view of two explosively bonded coaxial cylinders from which may be milled a stem, rotor hub, rotor sleeve, and an inner jacket in accordance with an alternative embodiment of the present invention.

FIG. 4C illustrates an alternative method for explosively bonding a rotor sleeve 200 to an inner jacket 202. A solid inner cylinder 204 preferably comprising TZM is explosively bonded to a hollow intermediate cylinder 206 preferably comprising core iron or steel in accordance with the present invention. Then, a hollow outer cylinder 208, preferably comprised of copper and shorter than the other two cylinders, is explosively bonded to the outer surface of the intermediate cylinder 206, thereby forming a three layer solid bonded cylinder 210. From this bonded cylinder 210 are milled the several tube components as depicted partially in phantom in FIG. 4C: a stem 212 preferably comprising TZM, a rotor hub 214 preferably comprising core iron or steel, a rotor sleeve 200 preferably comprising copper, and an inner jacket 202, comprised preferably of core iron or steel, it being integral with the rotor hub 214. This alternative method for manufacturing x-ray tube components made be advantageous if the number of milling operations is desired to be minimized, whereas the method depicted in FIGS. 4A and B may be preferred where it is desired to minimize the amount of TZM sacrificed in the manufacturing process.

As noted, the explosion bonding process is also useful for assembling other component portions of the x-ray tube. For example, in yet another embodiment, the process could be used to assemble the constituent components of the rotating anode portion of the x-ray tube. A conventional rotating anode structure typically includes a target layer comprised of a suitable high Z material, which resides upon a suitable substrate material. One example would be a target layer comprised of tungsten or a tungsten-rhenium alloy, disposed upon a TZM or OFHC copper (or copper alloy) substrate portion. Typically, the structure is assembled using a target metal material in powder form, that is then pressed onto the substrate, which is also in a powder form. This assembly process involves high temperature sintering, forging, outgassing and/or brazing steps, all of which can cause such phenomena as grain growth in the materials that can decrease structural integrity.

In contrast, explosion bonding provides a high strength bond, and eliminates the high temperature steps conventionally required. As noted, the explosion bonding process is performed at close to room temperature, and thus the bonded materials retain original textures with little change in the microstructures, thus minimizing re-crystallization and/or grain growth. Moreover, the characteristics of the explosion-induced bond are particularly advantageous for the rotating anode component. In particular, the resulting wave-like interface between the target layer and the substrate provides an improved mechanical bond. The interface provides a superior joint for avoiding delamination of the target from the substrate—a situation that can occur with an interface tha is formed by casting or brazing.

In addition to these structural advantages, explosion bonding provides benefits in connection with the manufacturing of the rotating anode in terms of increased efficiency, minimized cost and increased production. For example, use of the explosion process eliminates the need for extensive chemical cleaning or purified water ultrasonic cleaning steps. Also, it reduces the need for potentially damaging high temperature outgassing run(s) typically required when bronzing or casting steps are used. Further, a large quantity of materials can be joined in a single run with the explosion bonding process, resulting in the efficient production of a larger number of anode targets. Compared to the piece-by-piece production process conventionally used, explosion bonding can thus result in lower cost targets. The process is also advantageous for anode manufacture because it provides flexibility in target geometries and sizes that can be produced. Further, the process allows for easier and more efficient testing of a resulting target, because a portion of a single bimetal plate (used to produce multiple targets, as described below) can be destructively and/or non-destructively tested without sacrificing target production quantity.

By way of example, in one preferred embodiment the production of a target anode structure utilizing a explosion bonding process is accomplished with a thin sheet of target material, such as tungsten or tungsten alloy (e.g., W—Re, etc.), and a corresponding substrate, such as TZM or OFHC copper or other copper alloy. Each of these components can be fabricated using any appropriate technique, including well known casting, rolling or forging processes. The target material is prepared in a thin, flat sheet form, having an appropriate thickness of, for example, 0.005 inches to 0.10 inches, depending on factors such as the ductility of the target material alloy. The substrate material layer is preferably thicker, and typically would be in the range of 0.25 inches to 3 inches. Again, the dimensions may vary depending on the particular material being used, and the x-ray tube type and application. For example, a thicker substrate may be utilized for accommodating internal cooling channel(s).

As previously described in connection with the other x-ray tube components, the two layers of material are attached using the explosion bonding process. As previously described, the bonding occurs progressively from one end of the layered materials to the other as the explosion energy creates a high temperature plasma that cleans oxides of the bonded surfaces, melts the adjacent superficial layers, and then joins them under the explosion impact force. Again, use of this process eliminates the need for a braze interlayer, reduces the need for extensive cleaning of the bonding surfaces, and limits the need for any extensive tooling setup and high temperature furnace runs for outgassing, brazing or casting.

Figure 5:
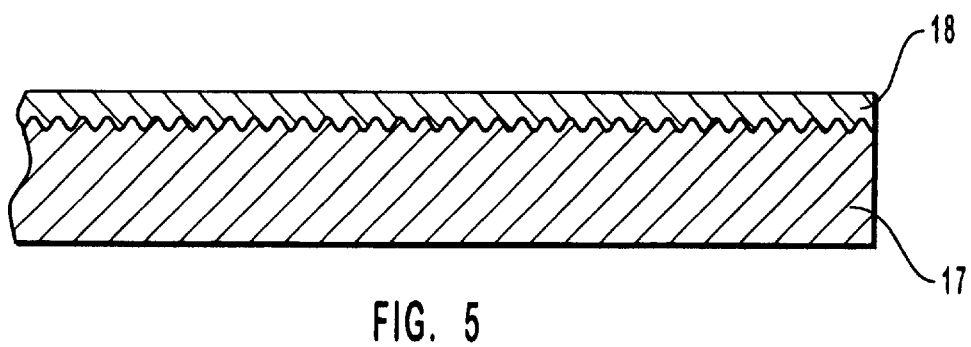
FIG. 5 is a cross sectional side view of a bi-metal plate, explosively bonded together, that can be used to form a target anode.
Figure 6:
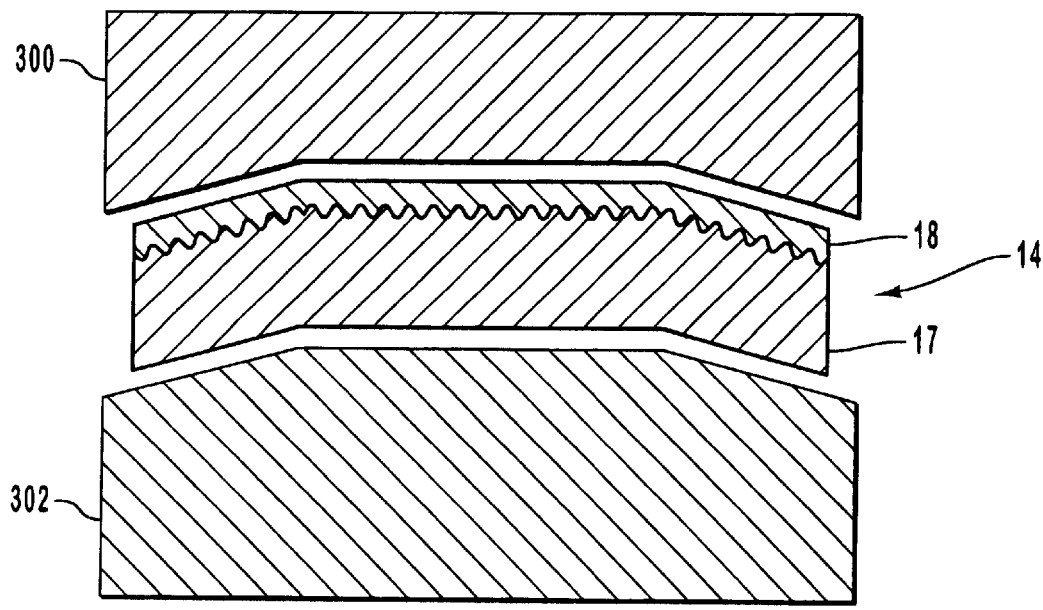
FIG. 6 illustrates one manner by which a target anode can be formed in a forming die when the explosion bonding process is used.

The explosion bonded bi-metal plate, such as is represented in FIG. 5, includes the sheet of target material 18 attached to the underlying substrate 17 layer via the bond interface of the sort described above. As noted, the provision of a single plate provides flexibility in the anode target manufacture not only in terms of its physical geometry, but in terms of increased quantity. In a preferred embodiment, the bonded anode plate then can be cut into individual anode sections. These individual sections can then be appropriately manipulated so as to provide the anode target 14 for use in an x-ray tube. For example, in one embodiment, an individual anode section can be heated, and placed in a forming die, as is shown in FIG. 6. The plates of the forming die 300 and 302 are shaped in accordance with the desired shape of the rotating anode target, providing, for example, the appropriate angle on the target surface.

Figure 7:
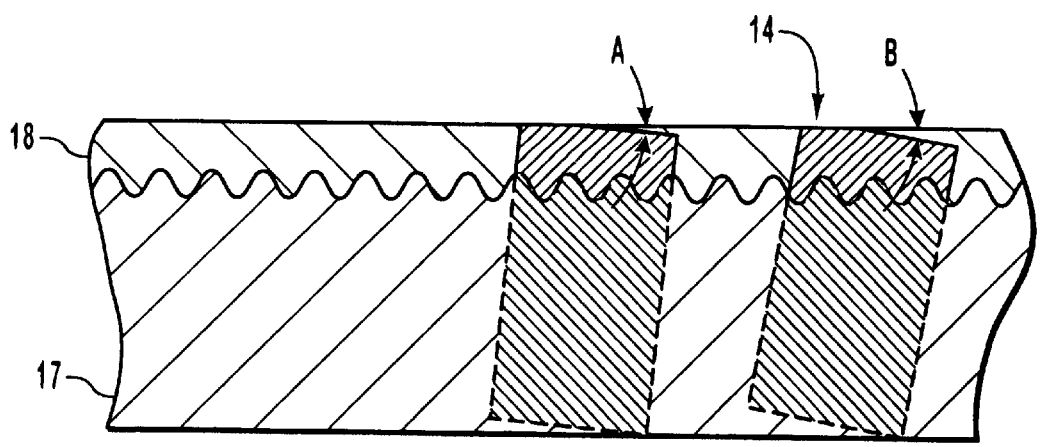
FIG. 7 illustrates yet another approach for forming a target anode.

Alternatively, if the anode section is to be formed for use in connection with a stationary anode x-ray tube, the section can be machined with an appropriate anode angle, such as is shown in FIG. 7. As is shown, the bimetal plate can be machined so as to provide stationary anode surfaces having a desired angle or shape, such as is represented at machined angles A and B.

The methods described above in connection with the preferred and alternative embodiments are but a few examples of the present inventive method for manufacturing and assembling x-ray tube components. The method disclosed herein may also be used to produce various other x-ray tube components as would be appreciated by one of skill in the art. Accordingly, the manufacture of such other x-ray tube components using the explosion bonding process are contemplated as residing within the claims of the present invention.

To summarize, the present method for manufacturing and assembling various components of an x-ray tube provides a stronger bond to be formed between the two components than is possible using known brazing, or other attachment techniques. This increased joint integrity is attributed to the metallurgical bond created by the explosion bonding method. The joint of such a bond is characterized by its wavelike appearance. Parts manufactured this way contribute to smoother anode rotation and a longer lasting x-ray tube, which in turn correlate to reduced manufacturing and replacement costs. Additionally, these parts possess an increased service temperature due to a better heat conduction from target to substrate that leads to a lower target temperature than those made by casting or brazing. It is so because it is difficult to form a complete bonding or to avoid intermetallics in these cases. The present method may also be utilized to manufacture other x-ray tube components, including, but not limited to, rotor sleeves and inner jackets.

The present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. A method for manufacturing metallic components of an x-ray tube, the method comprising the steps of:
    providing at least a first and a second metallic component;
    disposing the first and the second metallic component proximate one another;
    disposing an explosive material proximate the first metallic component such that the first metallic component is disposed between the explosive material and the second metallic component;
    detonating the explosive material such that explosive force produced thereby compresses the first and the second metallic component in such a way as to bond the first metallic component to the second metallic component; and
    forming the first metallic component into a rotor hub and the second metallic component into a rotor stem.

2. A method for manufacturing metallic components of an x-ray tube as defined in claim 1, further the comprising the step of:
    coating the first metallic component and/or the second metallic component with a coating such that the bond formed between the first and the second metallic component is enhanced.

3. A method for manufacturing metallic components of an x-ray tube as defined in claim 2, wherein the coating comprises any one of a group of elements consisting of nickel, chromium, and copper.

4. A method for manufacturing metallic components of an x-ray tube, the method comprising the steps of:
    providing a first x-ray tube component;
    providing a second x-ray tube component; and
    providing a bond interface between the first x-ray tube component and the second x-ray tube component, wherein the bond interface is formed by an explosion; and
    wherein the first x-ray tube component, the second x-ray tube component and the bond interface together form a rotor stem bonded to a rotor hub.

5. A method for manufacturing a stem and rotor hub for an x-ray tube, the method comprising the steps of:
    providing a solid cylinder comprising molybdenum as a major component;
    providing a hollow cylinder coaxially disposed about the solid cylinder such that a gap exists between the solid cylinder and the hollow cylinder;
    disposing an explosive material proximate the outer surface of the hollow cylinder;
    detonating the explosive material whereby the hollow cylinder is bonded to the solid cylinder to form a bonded cylinder; and
    milling the bonded cylinder to define a stem and a rotor hub suitable for use in an x-ray tube.

6. A method for manufacturing a stem and rotor hub for an x-ray tube as defined in claim 5, further comprising the step of:

defining in the rotor hub a plurality of holes suitable for mounting screws therein.

7. A method for manufacturing a stem and rotor hub for an x-ray tube as defined in claim 5, further comprising the step of:

defining on the stem threads such that the stem may operably attach to an anode.

8. A method for manufacturing a stem and rotor hub for an x-ray tube as defined in claim 5, further comprising the step of:

defining on the stem a circular disk upon which an anode may rest.

9. A method for manufacturing a stem and rotor hub for an x-ray tube as defined in claim 5, further comprising the step of:

operably attaching to the rotor hub a rotor sleeve suitable for dissipating heat.

10. A method for manufacturing x-ray tube components, the method comprising the steps of:

providing a solid metallic cylinder;

disposing a first hollow metallic cylinder concentrically about the solid metallic cylinder;

disposing an explosive material about the outer surface of the first hollow metallic cylinder;

detonating the explosive material, thereby explosively bonding the first hollow metallic cylinder to the solid metallic cylinder and creating a single bonded cylinder;

disposing a second hollow metallic cylinder concentrically about the single bonded cylinder;

disposing an explosive material about the outer surface of the second hollow metallic cylinder;

detonating the explosive material about the outer surface of the second hollow metallic cylinder, thereby explosively bonding the second hollow metallic cylinder to the single bonded cylinder and creating a double bonded cylinder;

milling the double bonded cylinder such that a stem, rotor hub, rotor sleeve, and inner jacket are defined therefrom.

11. A method for manufacturing x-ray tube components as defined in claim 10, wherein the solid metallic cylinder comprises TZM.

12. A method for manufacturing x-ray tube components as defined in claim 10, wherein the first hollow metallic cylinder comprises core iron.

13. A method for manufacturing x-ray tube components as defined in claim 10 wherein the first hollow metallic cylinder comprises steel.

14. A method for manufacturing x-ray tube components as defined in claim 10, wherein the second hollow metallic cylinder comprises copper.

* * * * *